(12) United States Patent
Jämsä et al.

(10) Patent No.: US 7,753,622 B2
(45) Date of Patent: Jul. 13, 2010

(54) METHOD FOR MAINTAINING THE WATER BALANCE IN A PROPERTY AND A WASTE WATER CONTAINER

(75) Inventors: Janne Jämsä, Djurhamn (SE); Svante Lind, Stavsnäs (SE)

(73) Assignee: Nordic ecoseptictank HB, Djurham (SE)

( * ) Notice: Subject to any disclaimer, the term of this patent is extended or adjusted under 35 U.S.C. 154(b) by 0 days.

(21) Appl. No.: 12/000,713

(22) Filed: Dec. 17, 2007

(65) Prior Publication Data

US 2009/0080977 A1    Mar. 26, 2009

(30) Foreign Application Priority Data

Sep. 25, 2007  (SE) .................................... 0702132

(51) Int. Cl.
*E02D 29/00* (2006.01)

(52) U.S. Cl. ........................................ 405/52; 405/36

(58) Field of Classification Search .................. 405/52, 405/36; 210/600; 137/255, 256, 262, 263, 137/563

See application file for complete search history.

(56) References Cited

U.S. PATENT DOCUMENTS 3,931,907 A * 1/1976 Henle .......................... 220/530
D430,919 S * 9/2000 Claussen ................... D23/202

OTHER PUBLICATIONS

Chem-tainer—Underground Water Tanks, Oct. 18, 1999.*
Darco Inc. Potable Water System, May 21, 2007.*
Darco Corportation, Fire Protection System, Feb. 12, 2004.*

* cited by examiner

*Primary Examiner*—David J Bagnell
*Assistant Examiner*—Benjamin Fiorello
(74) *Attorney, Agent, or Firm*—Young & Thompson

(57) ABSTRACT

Method for maintaining the water balance in a property equipped with a drainage system (4) for waste water, the waste water being conveyed via the drainage system (4) to a waste water container (6). The fresh water that constitutes a part of the waste water is supplied from a fresh water container (7), and the water balance is maintained in the property by supplying a quantity of water to the system, with the fresh water container (7) being replenished from a source outside the property, which quantity is essentially the same as the quantity of water that is led away from the system by the waste water container (6) being drained of waste water and the waste water being transported away from the property.

16 Claims, 1 Drawing Sheet

METHOD FOR MAINTAINING THE WATER BALANCE IN A PROPERTY AND A WASTE WATER CONTAINER

This is a U.S. non-provisional application which claims priority to Swedish application no. 0702132-2, filed Sep. 25, 2007. The content of the above-referenced application is hereby incorporated by reference in its entirety.

FIELD OF THE INVENTION

The present invention relates to a method for maintaining the water balance in the buildings and soil of a property. More precisely, the invention relates to such a method for properties that are equipped with a drainage system for waste water, the waste water being conveyed via the drainage system to a waste water container.

The invention also relates to a combined waste water container and fresh water container for use in the above-mentioned method.

TECHNICAL BACKGROUND OF THE INVENTION

Properties usually generate waste water in the course of their normal operation, for example from water closets, washbasins, showers, dishwashers, etc. Properties which lack a communal drain, for example, are faced by the problem of disposing of such waste water in an environmentally friendly manner.

A so-called infiltration plant can be used in certain cases, in which waste water is released into the ground after sludge separation and filtration. This is not always possible, however, because of current regulations, and it is the case in particular of waste water from water closets, which is associated with the risk of contaminating the ground and the groundwater inter alia with nutrient salts and bacteria.

Another alternative is to install a closed tank, in which waste water is stored. Such a tank is emptied regularly or as required, and the waste water is then transported away from the property for disposal in an appropriate manner. In the case of properties which do not have a public water supply, for example, it is often not advisable or permissible to install such a closed tank, because fresh water is then taken from the groundwater via an excavated or bored well or the like, which causes disequilibrium in the groundwater balance for the property with the associated risk of salt water penetration and drying-up of water wells when groundwater is removed without being returned to the groundwater in the same quantity.

Furthermore, it is often not advisable or permissible to use fresh water from watercourses or the sea, for example for flushing a water closet that is connected to an infiltration plant, as this can introduce unacceptably large amounts of nutrient salts and bacteria into the local environment next to the property.

The present invention solves the problems described above.

SUMMARY OF THE INVENTION

The invention accordingly relates to a method for maintaining the water balance in a property equipped with a drainage system for waste water, whereby the latter is conveyed via the drainage system to a waste water container, and is characterized in that the fresh water that constitutes a part of the waste water is supplied from a fresh water container, and in that the water balance is maintained in the property by supplying a quantity of water to the system, by the fresh water container being replenished from a source outside the property, which quantity is essentially the same as the quantity of water that is led away from the system by the waste water container being drained of waste water and this being transported away from the property.

BRIEF DESCRIPTION OF THE DRAWING

The invention is now described in detail with reference to illustrative embodiments of the invention and the accompanying drawings, in which.

Figure 1:
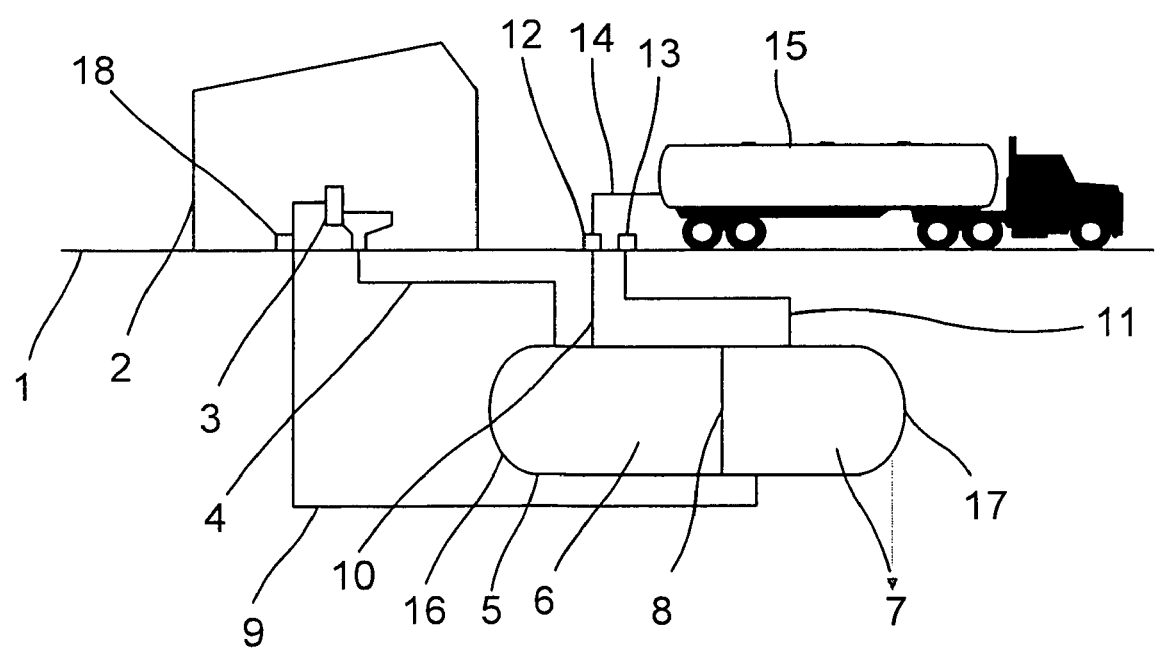
FIG. 1 is a cross-sectional view, which illustrates a method and a waste water and fresh water container in accordance with the present invention.

A property comprises a building 2 arranged on the ground 1, inside which building a water closet 3 is arranged. When it is used, the water closet 3 gives rise to waste water, which contains on the one hand fresh water that is used as flushing water, and on the other hand the solid and/or liquid waste that is flushed down the toilet.

Waste water is conveyed, via a drainage system 4, to a container 5. According to one preferred embodiment, the container 5 is configured as a single, elongated and essentially cylindrical body, which is divided into two separate spaces 6, 7 by an internal, watertight dividing wall 8. One space 6 is so arranged as to hold waste water, whereas the other space 7 is so arranged as to hold fresh water.

The expression "fresh water" is used in this context to denote water of a quality such that it is suitable for use, for example, for flushing in a water closet. It is thus not necessary, although it may nevertheless be preferable in certain cases, depending on the application for the fresh water to maintain drinking water quality.

A pipe 9 connects the fresh water container 7 to the water closet 3, and a pump device 18 of a previously disclosed kind is used to convey fresh water to the flushing device of the water closet 3 for use in conjunction with flushing. It will be appreciated that it is also possible to use gravity in order to convey fresh water to the flushing device of the water closet 3, depending on actual differences in height between the constituent parts of the system.

Fresh water is thus taken from the fresh water container 7 and is used for flushing the toilet 3, in conjunction with which the material that is flushed away, including the fresh water, is conveyed to the waste water container 6. No fresh water source other than the fresh water container 7 need be used for flushing in the water closet 3, and the system is completely closed in relation to the immediate environment of the property.

The waste water container 6 is connected to an emptying device 12 via a first pipework system 10. The fresh water container 7 is connected to a replenishing device 13 via a second pipework system 11. Both the first 10 and the second 11 pipework systems are of a previously disclosed kind and include the necessary valve devices, etc.

The emptying device 12 is configured so that the waste water can be drawn off from the waste water container 6, via the emptying device 12, by pumping action, suction action or by some other appropriate means, for subsequent disposal with the help of a tanker vehicle 15. The replenishing device 13 is arranged in a corresponding manner so that fresh water can be replenished, via the replenishing device 13, from a tanker vehicle 15. It will be appreciated that the waste water can be transported away from the property by other appropriate means. In a similar fashion, fresh water can be replenished by other appropriate means, provided that it comes from a source outside the property.

DETAILED DESCRIPTION OF THE INVENTION

Depicted in FIG. 1 is a tanker vehicle 15 in the course of emptying the waste water container 6, in conjunction with which a pipe 14 is used to connect the emptying device 12 to the tanker vehicle 15. A corresponding procedure can be adopted for replenishing with fresh water.

Emptying and replenishing of waste water and fresh water respectively can take place in the course of a single visit to the property by one and the same tanker vehicle 15. Alternatively, the same or different tanker vehicles 15 can be used respectively to empty waste water and to replenish with fresh water. According to a preferred embodiment, the same tanker vehicle 15 is used for both emptying and replenishing, both operations being performed in the course of one and the same visit to the property. The use of such a method reduces the necessary number of visits to the property by the tanker vehicle 15. The same tank in the tanker vehicle 15 can be used in the event that the same tanker vehicle 15 is used for emptying as well as replenishing, although it will be appreciated that the tanker vehicle 15 can also be configured with at least two separate tanks, where waste water and fresh water respectively are stored in different tanks in order to avoid the spread of bacteria and the like.

The waste water can then be transported, with the help of the tanker vehicle 15, to a treatment plant or a designated discharging place.

Because no water in this preferred embodiment is taken from groundwater, watercourses or other natural sources in or in the vicinity of the property for flushing in the toilet 3, and because all the water that is used for flushing in the toilet 3 is transported away from the property, the water balance can be maintained in the property with regard to the use of the water closet 3. In other words, the quantity of water that can be supplied to the system by replenishing the fresh water container 7 is essentially as large as the quantity of water that is removed from the system by the waste water container 6 being drained of waste water. The loading on existing or newly installed infiltration systems, if these are indeed required, thereby reduces because the quantity of bacteria and nutrient salts in the drains connected to such systems reduces. The need to take water from groundwater, lake water, sea water or rainwater, or from some other local water source, also reduces.

That the quantity of water supplied to the system by replenishing the fresh water container 7 is essentially as large as the quantity of water that is removed from the system by drawing off waste water from the waste water container 6 is intended to mean that a complete water balance can be achieved in the property with regard to the use of the water closet 3, but that it is also possible, for example, to supply extra fresh water from another source, for example an excavated well, in the event that the fresh water container 7 contains insufficient water at the time in question. In this event, it is preferable to permit not more than approximately 10% of the total fresh water to be supplied from a source other than the fresh water container 7.

Other water closets that are present in the building 2, but also showers, washing machines, dishwashers, sinks and similar appliances, can also be readily connected to the waste water container 6 and in addition supplied with fresh water from the fresh water container 7. It is also possible for only certain of the fresh water-consuming appliances that are present in the building 2 to be connected to the waste water container 6 and the fresh water container 7 respectively, depending on what demands are placed on achieving the intended water balance, on any existing infiltration systems that can accept waste water of certain specifically stipulated qualities, on the existing availability of fresh water, on usable fresh water available in the immediate environment, and so on.

According to one particularly preferred embodiment, all the fresh water which, together with waste, produces blackwater in the property is supplied from the fresh water container 7, and the waste water in the waste water container 6 is transported in its entirety away from the property. The expression "blackwater" is used in this context to denote waste water of a kind which consists for the most part of toilet waste mixed with fresh water.

According to a preferred embodiment, the pipe 9 is furthermore connected via a device (not shown), which can provide a water-consuming appliance in the building 2 with fresh water from an alternative source in the event that the fresh water container 7 is empty for whatever reason. Such an alternative source can, for example, consist of the property's normal source of drinking water, such as an excavated well. What is achieved in this way is that the water-consuming appliances that are present in the building 2, such as toilets 3, are also able to function in the event that the access to fresh water from the fresh water container 7 is restricted.

It is preferable for the container 5 to be of the waste water tank type. The container is preferably buried in the ground down to a frostproof depth. This offers the advantage of a reduced risk of frost damage in the installation in climatic zones where frost normally occurs during the winter period. Moreover, the ground area required to accommodate the installation is smaller than if it had been positioned fully or partially above the surface of the ground. It will be appreciated, however, that it can also be positioned fully or partially above the surface of the ground, depending on the particular application. For example, a tank that is positioned fully or partially above the surface of the ground can be insulated in order to achieve essentially the sane frost-resistance characteristics as a buried tank, where necessary in combination with heating the contents of the tank, for example with an immersion heater.

In FIG. 1, the container 5 is depicted as a single elongated body, which is divided by the dividing wall 8 into the two separate containers 6, 7 for waste water and fresh water respectively. Such a container 5 of the combination type can advantageously consist of a hollow glass fibre construction, for example in the form of an elongated, cylindrical glass fibre tube, which constitutes the envelope surface of the container 5 and which is delimited by an external wall 16, 17 at either end. The two external walls 16, 17 can exhibit any suitable form, such as hemispherical or domed, and are advantageously secured to the respective ends of the glass fibre tube. The dividing wall 8 consists of a similar wall, which can also be hemispherical or domed or may have some other execution, and which is secured to the inner envelope surface of the glass fibre tube.

According to one preferred embodiment, the container 5 is manufactured by first attaching a first external wall 16 and a dividing wall 8 to either side of a cylindrical glass fibre tube, whereupon a further glass fibre tube is attached to the other side of the dividing wall 8, and by then attaching a second external wall 17 to the other end of the further glass fibre tube, thereby closing the container 5. The final operation is to position the necessary outlets, inspection hatches and connections for the connection of the pipework systems 4, 9, 10, 11.

According to another preferred embodiment, the container 5 is a polyethylene tank. In this case, the container 5 is manufactured, for example, by rotational moulding.

It will be appreciated that it is possible to position the drainage system 4 so that it is connected to the pipework system 10, rather than directly to the waste water container 6. A similar situation applies for the pipework systems 9, 11.

It is preferable for the waste water container 6 to have a maximum capacity which exceeds the maximum capacity of the fresh water container 7. It is especially preferable for the waste water container 6 to have a maximum capacity which exceeds the maximum capacity of the fresh water container 7 by between 10% and 25%. Since the contents of the waste water container 6 also include, for example, liquid and/or solid material that has been flushed down the toilet, the volume of these contents during use will, in fact, generally exceed the volume of the fresh water in the fresh water tank 7.

The container 5 advantageously also has a total maximum capacity of between 2 and 10 $m^2$. The expression "total maximum capacity" of the container 5 is used in this context to denote the combined maximum capacity of the waste water container 6 and the fresh water container 7.

The fact that the container 5 is configured as a single, continuous body means that its method of manufacture is less costly, since the number of assembly stages and the consumption of materials are reduced. It is also possible to adapt conventional production methods to the manufacture of a combination container 5 of the type described above. The area of ground that is required for the installation of the system is smaller. The installation costs are also lower because only a single tank needs to be installed, rather than two separate tanks.

It will be appreciated, however, that the container 5 can also be configured as two or more separately arranged containers, which are not configured as a single, continuous body. For example, a waste water container 6 can be positioned separately from a fresh water container 7, where both may be positioned under the ground 1 at a frostproof depth or fully or partially above the ground, or where one may be positioned in a different manner from the other. It is naturally also possible to use more than one container for waste water and/or more than one container for fresh water, depending on the particular application.

Above, preferred embodiments have been described. It will be obvious to a person skilled in the art, however, that many changes can be made to the described embodiments without departing from the idea of invention. Thus, the invention need not be limited by the described embodiments, but is capable of being varied within the scope of the accompanying Claims.

The invention claimed is:

1. A method for maintaining water balance in a property equipped with a drainage system for handling waste water, said method comprising:
   providing a closed drainage system on said property for both fresh water supply and removal of waste water from a house on said property, said closed drainage system comprising a fresh water container connected to one or more appliances in said house, which are in turn connected to a waste water container in said drainage system, and
   supplying a quantity of fresh water from a source outside the drainage system to said fresh water container, wherein said quantity of supplied fresh water is essentially the same as a quantity of waste water removed or to be removed from said waste water container and taken off the property,
   wherein said closed drainage system is configured to: (i) hold said waste water in said waste water container so that the waste water is separate from the fresh water, (ii) remove said waste water from said property, and (iii) prevent contaminating said property and/or a ground water supply thereon with said waste water,
   wherein a portion of said fresh water is conveyed from said fresh water container to the house and is utilized to convey waste material from the house to said waste water container to thereby become part of said waste water in said waste water container,
   wherein the fresh water container and the waste water container are arranged to be fixed to said property,
   wherein the fresh water supplied to said closed drainage system is not taken from a ground water supply on said property,
   wherein each of the fresh water container and the waste water container is at least partially buried below ground on the property, and
   wherein the fresh water container and the waste water container are each positioned in a respective chamber inside one and the same combination container.

2. The method according to claim 1, wherein all of the fresh water which, together with waste, forms blackwater in the property, is supplied from the fresh water container, and the waste water in the waste water container is transported in its entirety away from the property.

3. The method according to claim 2, wherein the waste water is generated by at least one water closet in said property.

4. The method according to claim 2, wherein the fresh water container is caused to be replenished and the waste water container is caused to be emptied on the same occasion.

5. The method according to claim 2, wherein the fresh water is conveyed to one or more appliances in said property that is connected to the drainage system with the help of a pump device positioned adjacent to the fresh water container.

6. The method according to claim 2, wherein said combination container comprising a hollow glass fiber construction comprising an elongated glass fiber tube body that is enclosed at both ends, said tube being divided into a first and a second chamber by a dividing wall positioned in said elongated glass fiber tube body, said first chamber comprising the waste water container, said second chamber comprising the fresh water container.

7. The method according to claim 6, wherein said dividing wall comprises a glass fiber construction and is a water-tight barrier.

8. The method according to claim 1, wherein the waste water is generated by at least one water closet in said property.

9. The method according to claim 8, wherein the fresh water container is caused to be replenished and the waste water container is caused to be emptied on the same occasion.

10. The method according to claim 1, wherein the fresh water container is caused to be replenished and the waste water container is caused to be emptied on the same occasion.

11. The method according to claim 1, wherein the fresh water is conveyed to one or more appliances in said property that is connected to the drainage system with the help of a pump device positioned adjacent to the fresh water container.

12. The method according to claim 1, wherein said combination container comprising a hollow glass fiber construction comprising an elongated glass fiber tube body that is enclosed at both ends, said tube being divided into a first and a second chamber by a dividing wall positioned in said elongated glass fiber tube body, said first chamber comprising the waste water container, said second chamber comprising the fresh water container.

13. The method according to claim 12, wherein the waste water container has a capacity of between 10% and 25% greater than the capacity of the fresh water container.

14. The method according to claim 1, wherein the combination container is made of polyethylene.

15. The method according to claim 14, wherein the waste water container has a capacity of between 10% and 25% greater than the capacity of the fresh water container.

16. The method of claim 1, wherein each of the fresh water container and the waste water container is entirely buried below ground on the property.

* * * * *